(12) United States Patent
Drewes et al.

(10) Patent No.: US 8,807,952 B2
(45) Date of Patent: Aug. 19, 2014

(54) ROTOR BLADE FOR A WIND TURBINE

(71) Applicants: Stephan Drewes, Mönchengladbach (DE); Thomas Flöoth, Duisburg (DE); Mark Hirt, Bochum (DE); Lothar Patberg, Moers (DE); Peter Seyfried, Berlin (DE)

(72) Inventors: Stephan Drewes, Mönchengladbach (DE); Thomas Flöoth, Duisburg (DE); Mark Hirt, Bochum (DE); Lothar Patberg, Moers (DE); Peter Seyfried, Berlin (DE)

(73) Assignee: ThyssenKrupp Steel Europe AG, Duisburg (DE)

( * ) Notice: Subject to any disclaimer, the term of this patent is extended or adjusted under 35 U.S.C. 154(b) by 0 days.

(21) Appl. No.: 13/680,985

(22) Filed: Nov. 19, 2012

(65) Prior Publication Data
US 2013/0078105 A1 Mar. 28, 2013

Related U.S. Application Data

(63) Continuation of application No. PCT/EP2011/056643, filed on Apr. 27, 2011.

(30) Foreign Application Priority Data

May 21, 2010 (DE) .......................... 10 2010 017 062

(51) Int. Cl.
F03D 1/06 (2006.01)
F03D 11/00 (2006.01)
H02G 13/00 (2006.01)

(52) U.S. Cl.
CPC ............. *F03D 1/0675* (2013.01); *Y02E 10/722* (2013.01); *F03D 11/0033* (2013.01); *F05C 2253/04* (2013.01); *F05B 2280/6003* (2013.01); *Y02E 10/721* (2013.01); *H02G 13/00* (2013.01)

USPC ......................... 416/224; 416/230; 416/229 A

(58) Field of Classification Search
USPC ....... 416/232 R, 224, 226, 229 R, 230, 231 R, 416/232, 233, 241 A, 229 A
See application file for complete search history.

(56) References Cited

U.S. PATENT DOCUMENTS 4,976,587 A * 12/1990 Johnston et al. .............. 416/230
8,408,875 B2 * 4/2013 Quell et al. ................ 416/204 R

FOREIGN PATENT DOCUMENTS

| DE | 69520220 T2 | 6/2001 | |
|---|---|---|---|
| DE | 10214340 C1 | 11/2003 | |
| DE | 10300284 A1 | 7/2004 | |
| DE | 60203804 T2 | 10/2005 | |
| DE | 102007020338 A1 | 10/2007 | |
| DE | 102007036917 A1 | 2/2009 | |
| DE | 102008055477 A1 | 6/2009 | |
| EP | 1 826 402 A1 | 8/2007 | |
| EP | 2 153 964 A1 | 2/2010 | |
| GB | 2465167 A | 5/2010 | |
| WO | WO 2007131589 A2 * | 11/2007 | ................ F03D 1/06 |

* cited by examiner

*Primary Examiner* — Edward Look
*Assistant Examiner* — Juan G Flores
(74) *Attorney, Agent, or Firm* — Reinhart Boerner Van Deuren P.C.

(57) ABSTRACT

The invention relates to a rotor blade for a wind turbine, comprising a root of the rotor blade and a rotor blade airfoil. The object of providing a rotor blade which can be easily and inexpensively produced even when of great lengths and which, what is more, enables a system for protection against lightning to be incorporated in a simplified way is achieved, for a rotor blade of the generic kind, by having the rotor blade consist of at least partly a fiber-reinforced plastics composite having metal inserts embedded in the matrix of the fiber-reinforced plastics composite.

19 Claims, 2 Drawing Sheets

ROTOR BLADE FOR A WIND TURBINE

CROSS-REFERENCE TO RELATED PATENT APPLICATIONS

This patent application is a continuation of International Application No. PCT/EP2011/056643 filed on Apr. 27, 2011, which claims the benefit of German application No. 10 2010 017 062.3 filed on May 21, 2010, the teachings and disclosure of which are hereby incorporated in their entirety by reference thereto.

FIELD OF THE INVENTION

The invention relates to a rotor blade for a wind turbine comprising a rotor blade root and a rotor blade aerofoil.

BACKGROUND OF THE INVENTION

The generation of electrical energy by the use of wind turbines is a field which is expanding to an ever greater extent. Because of this massive expansion there are only a limited number of sites for wind turbines, which means that to an increasing degree smaller wind turbines are being replaced by ones giving higher outputs. Another trend is for wind turbines to be installed in off-shore coastal regions. It is here that wind turbines giving the highest outputs are generally installed. Higher outputs call for bigger wind turbines and these thus have to have rotors of diameters from 80 to 160 m. A rotor blade comprises a rotor blade root to connect the rotor blade to the hub of the rotor and a rotor blade aerofoil. The rotor blade aerofoil is intended to convert the kinetic energy of the wind into a rotary movement of the rotor in the optimum way. The rotor blade root serves to transmit the torques involved to the hub of the rotor and hence to the generator of the wind turbine.

Up to a rotor diameter of approximately 80 m, it is often fibre-reinforced plastics composites based on a plastics material reinforced with glass fibre which are used. At larger rotor diameters of more than 80 m it is a combination of glass-fibre reinforced plastics materials (GFRP) and carbon-fibre reinforced plastics materials (CFRP) which is used. However, this hybrid construction is very cost-intensive. The aim of the hybrid construction is to keep the deflection or bowing of the individual rotor blade as low as possible when under load when the rotors are of these extreme diameters. Another problem is the system for protecting rotor blades against lightning, which imposes additional costs when rotor blades of the said hybrid construction are being produced. What is more, the pressure from costs is already high when wind turbines are being produced, particularly ones in the higher output ranges. To solve this problem there is a rotor blade for wind turbines known from German unexamined patent application laid open to public inspection DE 10 2007 036 917 which has stressing members arranged in the rotor blade which place a spar provided in the rotor blade under compressive stress, thus minimising stress-dependent deformations due to wind loads. On the one hand a combination of CFRP and GFRP plastics materials is used even in this solution and on the other hand this solution, too, does not have an integral system for protection against lightning.

SUMMARY OF THE INVENTION

Taking the above as a point of departure, the object underlying the present invention is to provide a rotor blade which can be easily produced even when of very great lengths and which, what is more, enables a system for protection against lightning to be incorporated in a simplified way.

In accordance with the invention, this object is achieved, for a rotor blade of the generic kind, by having the rotor blade comprise at least partly a fibre-reinforced plastics composite having metal inserts embedded in the matrix of the fibre-reinforced plastics composite.

The use of metal inserts, in particular ones of steel, in the matrix of a fibre-reinforced plastics composite enables the advantageous mechanical properties of metal, and in particular of steel, to be combined with those of the fibre-reinforced plastics composite. In particular, the high modulus of elasticity of steel enables rotor blades of very great lengths to be constructed in a simplified way. Furthermore, the insertion of metal inserts in the matrix of the fibre-reinforced plastics composite can easily be incorporated in the existing production process, which means that the expected costs of production will not be higher. The proportion of CFRP plastics can be significantly reduced or avoided by the use of metal inserts, thus enabling production to be less expensive. In addition, the metal inserts are able to act as an integral system for protection against lightning.

In a further embodiment of rotor blade according to the invention, a variant which is particularly effective in saving on costs may be provided by embedding metal inserts in the matrix of a glass-fibre reinforced plastics material (GFRP) and by having at least some of the metal inserts extend in the longitudinal direction of the rotor blade. Glass-fibre reinforced plastics materials are considerably less expensive as compared with carbon-fibre reinforced plastics materials. In combination with the metal inserts, they can be produced as composite materials to be particularly stiff in bending. The metal inserts may for example be provided both in the aerofoil of the rotor blade and in its root, which means that no additional inserts have to be provided to connect the rotor blade and the hub of the rotor.

In a further embodiment of rotor blade according to the invention, the metal inserts follow the outline of the rotor blade, which means that the construction according to the invention is also able to ensure the existence of the aerodynamic properties which the rotor blade aerofoil usually has.

For the different loads to be dealt with properly both in the root of the rotor blade and in its aerofoil, the metal inserts may, in a further embodiment of rotor blade according to the invention, be of different lengths, an option being for the metal inserts to be arranged in a plurality of layers in the rotor blade. Inserts of different lengths may for example be so arranged that there is a large number of layers of metal inserts in the region of the root of the rotor blade and only a few metal inserts are still provided in the region of the tip of the rotor blade. The high bending moments which may occur in operation in the region of the root of the rotor blade can, in particular, be very well withstood with this arrangement of the metal inserts, especially when they are of steel.

In a further embodiment of rotor blade according to the invention, the problem that, at high loads, connecting joints may cause problems relating to the stiffness of metal inserts can be solved by the fact of the metal inserts not having any connecting joints. The metal inserts, being in one piece or in other words consisting of a single material, are ideally adapted to years of use in the rotor blade in this way. However, a basic possibility which also exists is for different loading situations to be allowed for with a single metal insert by for example using metal inserts produced from tailored products such for example as blanks and/or strips. What is also conceivable is the use as metal inserts of tailored rolled blanks, which are both free of any connecting joints and also have regions adapted to different loads. What are preferably considered to be connecting joints for the purposes of the present invention are joints made by bonding or coalescence, i.e. welded, soldered, brazed or adhesive-bonded joints. However, in principle what may also be used are metal inserts connected by friction and/or positive interengagement. The latter are generally easier to manufacture.

In the next embodiment of rotor blade according to the invention, at least some of the metal inserts extend into the root of the rotor blade. This embodiment according to the invention ensures that the forces acting on the rotor blade aerofoil are more satisfactorily transmitted to the root of the rotor blade and the hub of the rotor. Additional metal inserts in the region of the root of the rotor blade can also be avoided in this way.

To improve the ability of the metal inserts to withstand forces or to transmit them to the other parts of the rotor blade, and also to save weight, the metal inserts have shapings and/or punchings in a further embodiment of rotor blade according to the invention. The shapings may consist of the provision of, for example, a fold, which is then lodged in addition in the matrix of the fibre-reinforced composite and thus brings with it improved anchoring and hence an improved transmission of force to the metal insert. However, there are also other shapings which are conceivable such for example as deep-drawn regions or embossings. Punchings, such for example as punched perforations, make it possible not only for the weight of the metal insert to be reduced but also for the fibre-reinforced plastics composite to be able to enclose the metal insert particularly well and, this being the case, for the anchoring of the metal insert in the matrix of the fibre-reinforced plastics composite to be improved.

To improve the anti-corrosion characteristics, the metal inserts used may for example be carbon steel which have surface coatings or consist of stainless steel. What may be considered in this case is for example the use of galvanized steel inserts or even the use of metal inserts provided with organic coatings.

A rotor blade which is optimised in respect of the corrosion of the metal inserts may be provided by having at least the steel inserts arranged on the outside consisting of a stainless steel and the inner steel inserts consisting of a carbon steel. Stainless steel is known to have an extremely high resistance to corrosion and it can therefore, in the outer region of the rotor blade, readily be exposed to the weather conditions out at sea and, at the same time, can be used as an outer system for protection against lightning. Because of their position, the inner metal inserts may be optimised for strength and cost by using carbon steel without the requirements relating to corrosion resistance being a primary concern.

To deal with special mechanical loads, there are provided in a further embodiment of rotor blade according to the invention metal inserts of which at least some consist of a plurality of overlapping metal strips and which, as an option, are laid out in the same way as a leaf spring. Metal inserts of this kind already have, per se, different stiffnesses as a result of their construction and can easily be provided in the rotor blade in conjunction with the fibre-reinforced plastics composite.

Depending on the material used in any given case, the metal inserts may, in a further embodiment of rotor blade according to the invention, be of a thickness from 0.3 to 5 min and preferably of a thickness from 1.0 to 3.0 mm. In these thickness ranges, the steel inserts in particular are able to show their advantages in respect of easy production and the provision of very high stiffnesses in bending.

If, in a further embodiment of the invention, the rotor blade aerofoil has two half-shells and web members extending in the longitudinal direction between the half-shells, with at least one upper and one lower chordwise span being provided between the web members, and metal inserts being provided in the upper and/or lower chordwise span, then a conventional production process can take place even when the hybrid construction according to the invention is employed. The chordwise spans are used to withstand the bending moment on the rotor blade aerofoil and may therefore be improved in respect of their load-bearing capacity by the use of the metal inserts. As well as meeting aerodynamic requirements, the leading edge of the rotor blade aerofoil facing into the wind also transmits transverse forces to the rotor blade. Metal inserts are also preferably provided in the leading edge of the rotor blade aerofoil. This is also the case with the trailing edge of the rotor blade aerofoil facing away from the wind, which has to serve in essence aerodynamic purposes. A spar may equally well be arranged between the half-shells in place of the web members to improve stiffness. The spar may preferably be produced by using metal inserts, too. Basically, it is however also conceivable for the rotor blade according to the invention to be produced by a winding technique without half-shells being used.

Finally, the rotor blade according to the invention is advantageously embodied by giving it a length of more than 40 m. It is usually cost-intensive CFRP plastics materials which are used for rotor blades of a length of more than 40 m. The rotor blade according to the invention therefore has considerably reduced production costs compared with the rotor blades of similar lengths known to date because metal inserts are substituted for CFRP.

BRIEF DESCRIPTION OF THE DRAWINGS

Furthermore, the invention will be explained in detail by reference to exemplary embodiments in conjunction with the drawings. In the drawings.

DETAILED DESCRIPTION OF THE INVENTION

Figure 1:
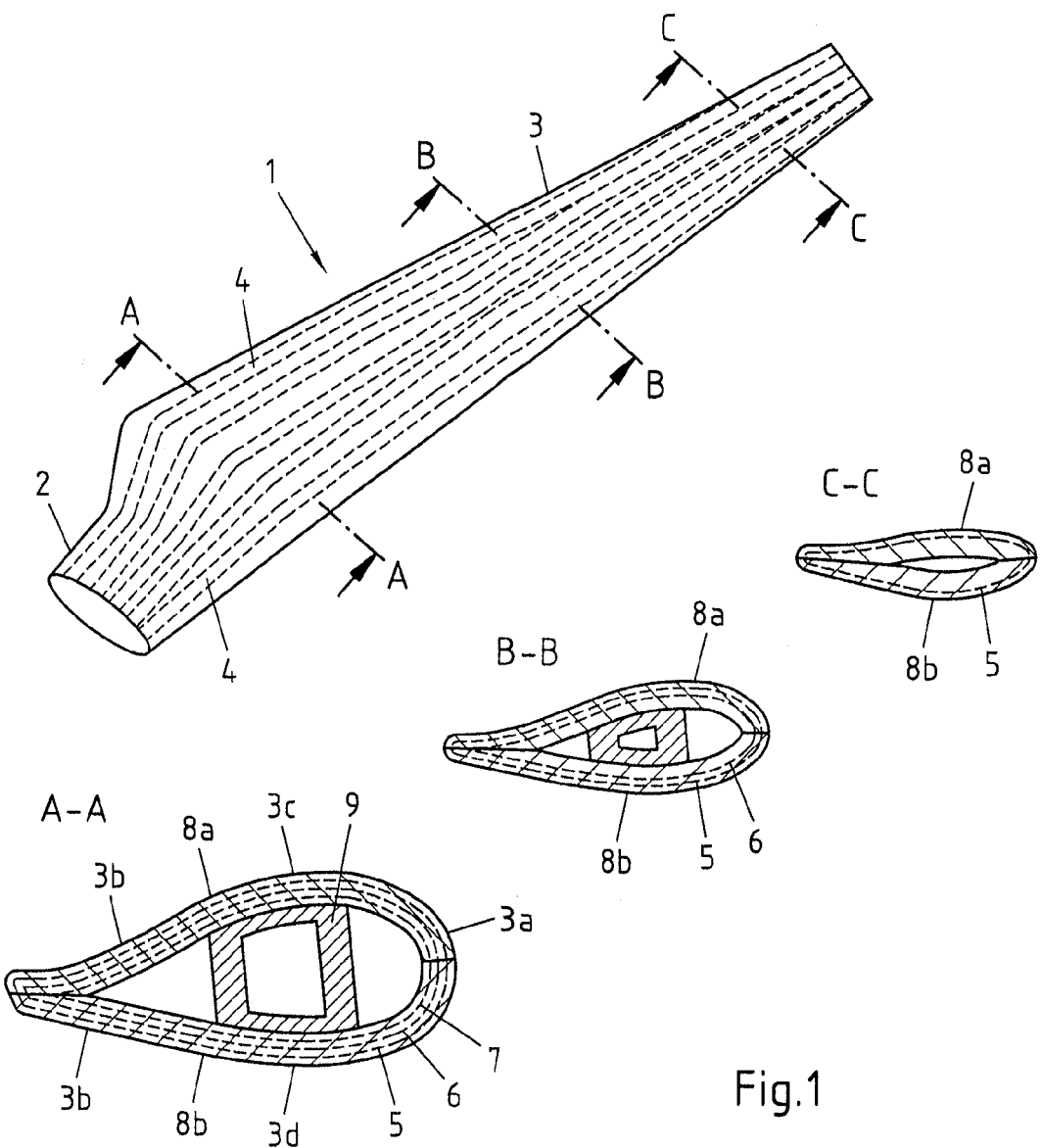
FIG. 1 shows a schematic perspective view of an exemplary embodiment of rotor blade according to the invention and its shape in cross-section at three different points.

FIG. 1 shows an exemplary embodiment of a rotor blade 1 according to the invention which has a rotor blade root 2 and a rotor blade aerofoil 3. Shown in addition in FIG. 1 are the shapes in cross-section of the rotor blade aerofoil 3 in the region of section lines A, B and C. Steel inserts are used as metal inserts. In the present exemplary embodiment the steel inserts 4 extend from the root 2 of the rotor blade into, in some cases, the tip of the rotor blade. This gives very good stiffness from the aerofoil of the rotor blade into the root of the rotor blade. The steel inserts 4 may also be used to couple the rotor blade to the rotor hub of the wind turbine (not shown).

As can be seen from section A, the steel inserts 4 are provided in three layers 5, 6, 7 in the region of the root 2 of the rotor blade. Because of the plurality of layers 5, 6, 7, the steel inserts 4 are able to withstand higher bending moments in the region of the root of the rotor blade and are able to make the root of the rotor blade particularly stiff in bending. Section B shows that there are only two layers 5, 6 of steel inserts 4 present at this point. This can be achieved by for example using steel inserts 4 of different lengths to cater for the differently loaded regions of the rotor blade 1. Only one layer 5 of steel inserts 4 is provided at the tip of the rotor blade, section C. The use of different numbers of layers of inserts also produces a reduction in the weight of the rotor blade 1 as a whole, with allowance made for the particular loading situations which exist in the different regions of the rotor blade 1.

What FIG. 1 also shows is that the rotor blade 1 is produced by a half-shell technique and consists of half-shells 8a and 8b which have an internal spar 9 extending in the longitudinal direction. The spar 9 is used to withstand forces and moments arising in the operation of the rotor blade 1. However, what may also be provided in place of the spar 9 are web members which support at least a section or sections of the two half-shells 8a and 8b, as will later be shown in FIG. 4.

The spar 9 but also the root 2 and the aerofoil 3 of the rotor blade may be produced by using a GFRP plastics material and may achieve the desired stiffnesses by the use of the steel inserts, thus enabling the cost-intensive CFRP plastics material to be largely dispensed with. It is, however, also conceivable for CFRP plastics material to be used in conjunction with steel inserts in order to meet special requirements.

The steel inserts 4 follow the outline of the rotor blade aerofoil 3 and are provided, in the exemplary embodiment shown, both in the leading edge 3a of the rotor blade aerofoil and in the trailing edge 3b of the rotor blade aerofoil, thus enabling the rotor blade 1 to also meet the requisite aerodynamic requirements. The upper and lower chordwise spans 3c and 3d of the rotor blade aerofoil 3 also have steel inserts 4 and are thus optimally adapted to withstand the tensile and compressive stresses caused by the bending moments on the rotor blade aerofoil 3.

Figure 2:
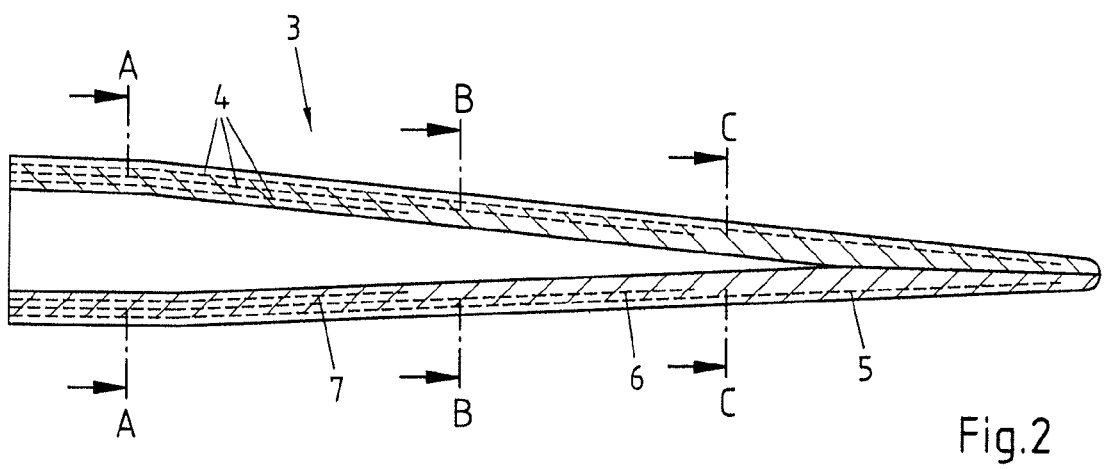
FIG. 2 is a longitudinal section through the exemplary embodiment shown in FIG. 1.

FIG. 2 is a longitudinal section of the exemplary embodiment shown in FIG. 1 along the rotor blade aerofoil 3. To orientate the viewer, the positions of the cross-sections A, B and C are also shown in FIG. 2. It can be seen that, initially, three layers 5, 6, 7 of metal inserts are provided in the rotor blade aerofoil 2. The steel inserts 4 of different lengths which are provided in the layers 5, 6, 7 ensure that there is a gradient of stiffness in the rotor blade 1. This gradient is, for example, achieved by decreasing the number of layers 5, 6, 7 of steel inserts 4 arranged one above the other in the longitudinal direction towards the tip of the rotor blade 1. In spite of the stiffness gradient, the rotor blade according to the invention can still be produced easily in this way. The steel inserts 4 can in fact be readily incorporated in the existing production process used to produce the rotor blade 1.

Figure 3:
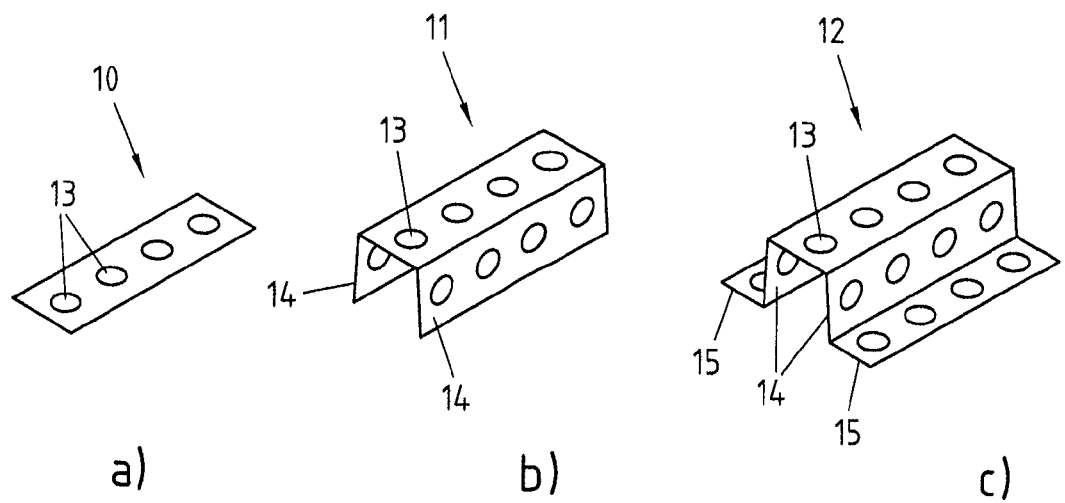
FIG. 3 shows schematic perspective views of four different examples of metal inserts.

Different embodiments of the steel inserts are shown in schematic perspective views in FIG. 3. The steel inserts 10, 11, 12, 17 each have punchings 13, through which the plastics material, such for example as a glass-fibre reinforced plastics material, is able to pass and thus results in better anchoring of the steel inserts 10, 11, 12 (FIGS. 3a), 3b), 3c) and 3d)).

Shown in FIG. 3b) is an exemplary embodiment of steel insert 11 which has not only punchings 13 but also, as well as these, a shaping in the form of a skirt 14 which can be sunk in the matrix of the plastics material. This too gives better anchoring of the steel insert 11, against its slipping sideways for example. A further improvement over this is achieved by providing not only a skirt 14 but also an additional flanged region 15 which projects in turn at an angle from the skirt 14. In all its regions, i.e. including in the skirt region 14 and the flanged region 15, the steel insert 12 has punchings 13 which serve to provide improved anchoring for the steel insert 12 and, at the same time, to reduce its weight. The steel insert 17 can be formed into a hollow profile, in which case it is also possible for the punchings to be dispensed with. More weight can be saved by this means, because the hollow profile is embedded in the matrix of plastics material as a closed profile filled with air.

Figure 4:
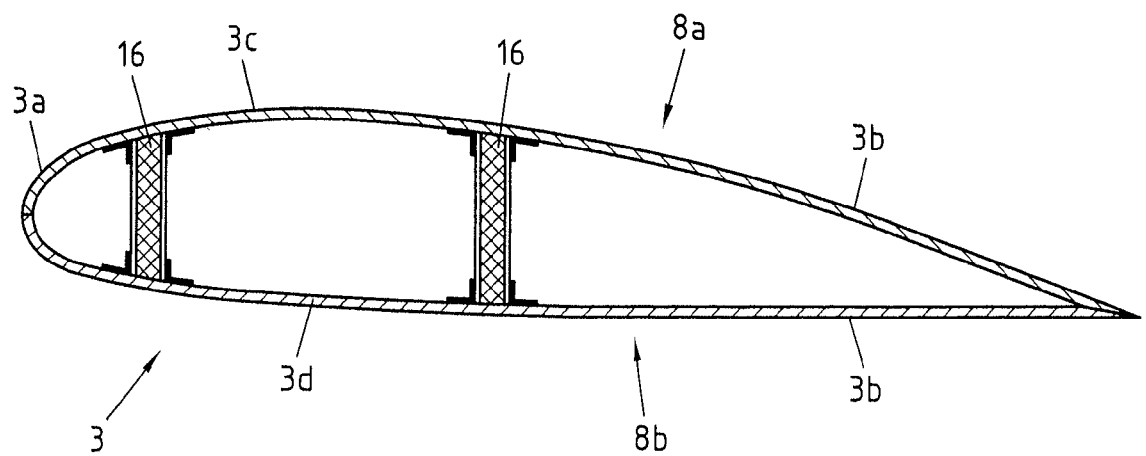
FIG. 4 is a view in section of an exemplary embodiment of rotor blade aerofoil according to the invention.

FIG. 4 shows the cross-section of the rotor blade aerofoil 2 of a further exemplary embodiment of a rotor blade 1 according to the invention. In this case too the rotor blade aerofoil 2 consists of two half-shells 8a and 8b, which are connected together in the region of the leading edge 2a of the rotor blade aerofoil and in the region of the trailing edge 2b of the rotor blade aerofoil. Also provided are two web members 16 extending in the longitudinal direction which support the half-shells 8a and 8b and are able to withstand transverse forces. The upper and lower chordwise spans 2c and 2d are arranged between the web members 16 and have in accordance with the invention steel inserts 4 although these are not shown in FIG. 4. The leading edge 2a of the rotor blade aerofoil, the trailing edge 2b of the rotor blade aerofoil and in principle the web members 16 as well may have steel inserts 4 which improve the stiffness characteristics of the rotor blade aerofoil 2 in these regions.

The invention claimed is:

1. Rotor blade for a wind turbine, comprising a rotor blade root and a rotor blade aerofoil, wherein the rotor blade at least partly consists of a fibre-reinforced plastics composite having metal inserts embedded in the matrix of the fibre reinforced plastics composite, and wherein the metal inserts are of different lengths; and wherein the metal inserts are of steel and are surface coated and/or consist of stainless steel.

2. Rotor blade according to claim 1, wherein the metal inserts are embedded in the matrix of a glass-fibre reinforced plastics material and at least some of the metal inserts extend in the longitudinal direction of the rotor blade.

3. Rotor blade according to claim 1, wherein the metal inserts follow the outline of the rotor blade.

4. Rotor blade according to claim 1, wherein the metal inserts have no connecting joints.

5. Rotor blade according to claim 1, wherein at least some of the metal inserts extend into the root and/or tip of the rotor blade.

6. Rotor blade according to claim 1, wherein the metal inserts have shapings and/or punchings.

7. Rotor blade according to claim 1, wherein the metal inserts are arranged to partly overlap each other.

8. Rotor blade according to claim 1, wherein the metal inserts are of a thickness of about 0.3 mm to about 5.0 mm.

9. Rotor blade according to claim 1, wherein the rotor blade aerofoil has half-shells and web members and at least one upper and one lower chordwise span are provided between the web members, and metal inserts are arranged in the upper and/or lower chordwise spans.

10. Rotor blade according to claim 1, wherein the rotor blade is of a length of more than 40 m.

11. Rotor blade according to claim 1, wherein the metal inserts are laid out as a leaf spring.

12. Rotor blade according to claim 1, wherein the metal inserts are arranged in the rotor blade in a plurality of layers.

13. Rotor blade according to claim 1, wherein the metal inserts are of a thickness of about 1.0 mm to about 3.0 mm.

14. Rotor blade for a wind turbine, comprising a rotor blade root and a rotor blade aerofoil wherein the rotor blade at least partly consists of a fibre-reinforced plastics composite having metal inserts embedded in the matrix of the fibre reinforced plastics composite, and wherein the metal inserts are of different lengths; and wherein the metal inserts arranged on an outside of the rotor blade consist of a stainless steel and the inner metal inserts consist of a carbon steel.

15. Rotor blade according to claim 14, wherein the metal inserts are embedded in the matrix of a glass-fibre reinforced plastics material and at least some of the metal inserts extend in the longitudinal direction of the rotor blade.

16. Rotor blade according to claim 14, wherein the metal inserts follow the outline of the rotor blade.

17. Rotor blade according to claim 14, wherein the metal inserts have no connecting joints.

18. Rotor blade according to claim 14, wherein at least some of the metal inserts extend into the root and/or tip of the rotor blade.

19. Rotor blade according to claim 14, wherein the metal inserts have shapings and/or punchings.

* * * * *